US008589505B2

(12) United States Patent
Kridner

(10) Patent No.: US 8,589,505 B2
(45) Date of Patent: Nov. 19, 2013

(54) METHOD AND APPARATUS FOR IDENTIFYING AND RETRIEVING MEDIA CONTENT

(75) Inventor: Jason D. Kridner, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2759 days.

(21) Appl. No.: 10/306,493

(22) Filed: Nov. 27, 2002

(65) Prior Publication Data

US 2004/0103217 A1 May 27, 2004

(51) Int. Cl.
*G06F 15/16* (2006.01)
(52) U.S. Cl.
USPC .......................................... 709/217
(58) Field of Classification Search
USPC .............. 709/247, 231, 217; 700/94
See application file for complete search history.

(56) References Cited

U.S. PATENT DOCUMENTS

| | | | | | |
|---|---|---|---|---|---|
| 5,963,916 | A | * | 10/1999 | Kaplan | 705/7.29 |
| 5,987,525 | A | * | 11/1999 | Roberts et al. | 709/248 |
| 6,100,804 | A | * | 8/2000 | Brady et al. | 340/572.7 |
| 6,185,542 | B1 | * | 2/2001 | Moran et al. | 705/16 |
| 6,230,192 | B1 | * | 5/2001 | Roberts et al. | 709/217 |
| 6,434,535 | B1 | * | 8/2002 | Kupka et al. | 705/24 |
| 6,448,886 | B2 | * | 9/2002 | Garber et al. | 340/10.1 |
| 6,587,835 | B1 | * | 7/2003 | Treyz et al. | 705/14.64 |
| 6,622,158 | B1 | * | 9/2003 | Koyata et al. | 709/203 |
| 6,806,842 | B2 | * | 10/2004 | King et al. | 343/795 |
| 6,834,308 | B1 | * | 12/2004 | Ikezoye et al. | 709/231 |
| 2001/0054014 | A1 | * | 12/2001 | Noda et al. | 705/26 |
| 2002/0082931 | A1 | * | 6/2002 | Siegel et al. | 705/26 |
| 2002/0105861 | A1 | * | 8/2002 | Leapman | 369/2 |
| 2003/0086341 | A1 | * | 5/2003 | Wells et al. | 369/13.56 |
| 2003/0109944 | A1 | * | 6/2003 | Ritz et al. | 700/94 |
| 2003/0195924 | A1 | * | 10/2003 | Franke et al. | 709/203 |
| 2004/0034441 | A1 | * | 2/2004 | Eaton et al. | 700/94 |
| 2004/0044580 | A1 | * | 3/2004 | Haller | 705/17 |
| 2006/0044111 | A1 | * | 3/2006 | Kollar et al. | 340/10.1 |
| 2007/0070831 | A1 | * | 3/2007 | Schobben et al. | 369/30.32 |

* cited by examiner

*Primary Examiner* — Alicia Baturay
(74) *Attorney, Agent, or Firm* — Robert D. Marshall, Jr.; Wade James Brady, III; Frederick J. Telecky, Jr.

(57) ABSTRACT

The specification discloses a system and related method for retrieving encoded media content, such as retrieving audio tracks from a CD in MP3 format. The system involves attaching indicia to the media, or possibly a case or protective cover of the media, which uniquely identifies the content. An encoding retrieval and playback device has the ability to obtain the unique number identified by the indicia, where obtaining the unique number may be a consumer entering the number, may be by reading a barcode label, may be by reading the number from a radio frequency device and the like. Once the unique number has been obtained, the encoding retrieval and playback device retrieves the encoded media content from a server across a network connection. In this manner, a consumer need only be present to initiate the retrieval process, and the retrieval of the encoded media content may be completed without the presence of the consumer, and without inserting the storage media in the playback device.

16 Claims, 1 Drawing Sheet

METHOD AND APPARATUS FOR IDENTIFYING AND RETRIEVING MEDIA CONTENT

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to digital audio and video technologies. More particularly, the preferred embodiments are directed to retrieving digital audio and video files in encoded formats. More particularly still, the preferred embodiments are directed to retrieving digital audio and video files in encoded format over the internet where the storage media content is identified using a unique identifier attached to the media, such as a bar code.

2. Background of the Invention

With the increasing popularity of digitally based audio and video equipment, it is common for consumers to read and change the format of their audio and visual performances for playback on different devices. For example, it is common for consumers owning audio compact disks (CDs) to read the songs from the CD, modify the file format, and store the modified file on a non-CD device for playback, such as an MP3 player.

However, converting audio and video files from one format to another can be very time consuming. An exemplary case is a consumer wishing to convert the songs on an audio CD to an MP3 format. This conversion typically involves the consumer placing the CD into a CD reader in either a computer or a dedicated hardware device. The hardware device reads the content from the CD, and converts the content to a "WAV" format file. Thereafter, the "WAV" format file is converted to the MP3 format. Once this operation is complete, the consumer must be present to remove the CD from the hardware device. Depending upon the speed of the processor of the consumer's hardware device, it may take several minutes to convert each audio track on a CD to an MP3 format. If the CD contains 20 songs, the time to convert could easily exceed an hour or more, thus requiring the consumer's presence at least at the beginning and end of that hour time frame. Moreover, conversion of a video in digital versatile disk (DVD) format to a form suitable for playback on a computer-type device may take many hours, again depending upon the speed of the processor of the consumer's hardware device.

Thus, what is needed in the art is a method, and related hardware, to ease the consumer's burden in the conversion or encoding process.

BRIEF SUMMARY OF SOME OF THE PREFERRED EMBODIMENTS

The problems noted above are solved in large part by a method and related system for consumers to retrieve audio and video files in formats different than on the storage media purchased without the necessity of the consumer to be present at all phases of the conversion or encoding process. More particularly, the preferred embodiments are directed to each storage media device (such as a compact disk, digital versatile disk or other similar and after-developed devices) having a unique identifier. The unique identifier is preferably scanned or entered into a hardware device, which then retrieves the digital information in the format desired, for example via the internet. In this way, the user need only scan or otherwise enter the unique identifier for the audio or visual media to begin the process of acquiring the information in the desired file format. While in some cases acquiring the data in the desired format may be slower than conversion or encoding, the user's presence is only required to initiate the process.

More particularly, the preferred embodiments are directed to placing a barcode on the audio or video media that encodes a number that uniquely identifies the audio or video media. Preferably, the user need only place the audio or video media near a barcode reader of a conversion device (whether that be a personal computer or a stand-alone hardware device), which reads the unique identifier. The hardware device then preferably accesses a server across the Internet, and downloads the desired files in the desired file format to a storage device, such as a hard drive. In this way, the user need not expend the time required to insert the CD, DVD or the like, into the hardware device, but merely needs to scan the unique identifier. The process of acquiring the encoded media content is thus triggered, and may complete without further intervention by the consumer. Moreover, if the consumer has multiple CDs or DVDs for which an encoded media content is desired, these may be queued, and the consumer is free to pursue other interests while the hardware device downloads the desired file formats for all the queued disks.

The disclosed devices and methods comprise a combination of features and advantages that enable it to overcome the deficiencies of the prior art. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or mechanical connection. Thus, if a first device couples to a second device, that connection may be through a direct connection, or through an indirect connection via other devices and connections.

DETAILED DESCRIPTION OF THE PREFERRED EMBODIMENTS

The preferred embodiments of the present invention are directed generally to a system and related method for consumers to access and retrieve encoded versions of files and other data on playback or storage media. The preferred embodiments were developed in the context of audio compact disks (CDs) as the storage media, and therefore the following description is based on that developmental context; however, one of ordinary skill in the art, after reading and understanding the description below, could equivalently implement the systems and related methods in other audio and video technologies such as digital video disks (DVDs), and the like. Moreover, as the state of the technology advances in storage media for audio and video information, these systems and related methods may likewise be applied to those as yet developed storage devices.

Figure 1:
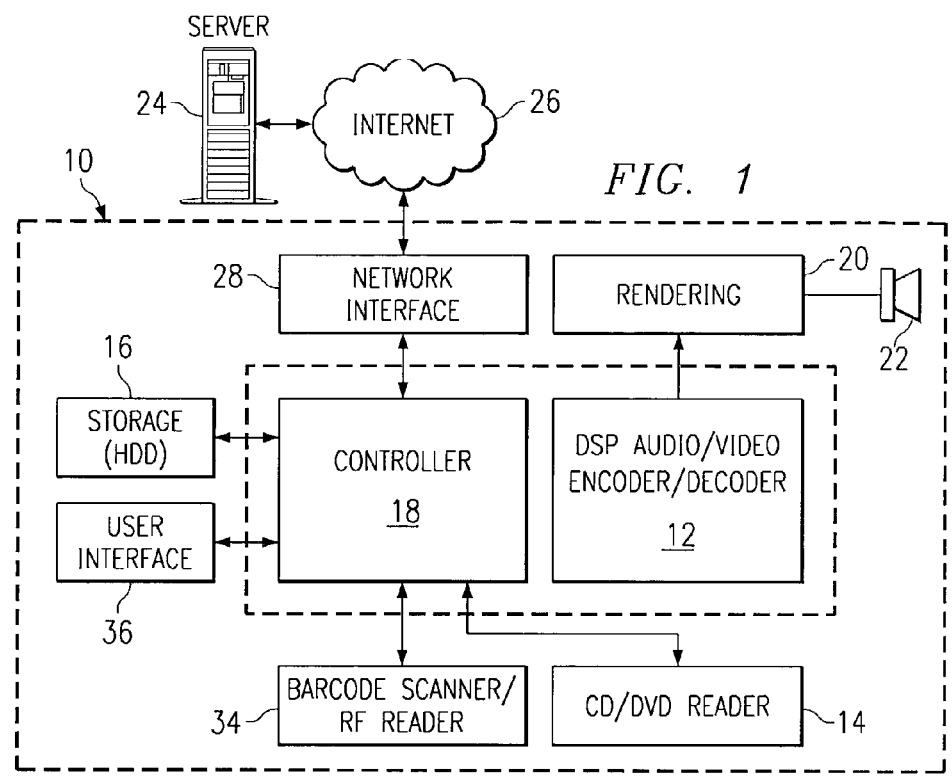
FIG. 1 shows, in block diagram form, an encoding retrieval and playback device of the preferred embodiments.

There are many stand-alone devices that play audio from compact disks (CDs). These devices may include home audio CD players, CD players for automobiles, and mobile or personal CD players. In each case, the audio is reproduced from information stored on the CD. However, owners of CDs may on occasion wish to play their audio from a different format, and possibly without the presence of the CD. For example, the owner of an audio CD may wish to transfer or encode the various audio tracks of a CD to MP3 format for play on a personal MP3 player. Other encoded forms exist, such as MP3Pro, Advanced Audio Codec (AAC), Windows Media Audio (WMA), Liquid Audio, and the like. The preferred embodiments of the present invention are directed to a system and related method for allowing a consumer access to an encoded version, regardless of form, of the content of a storage media without the user's hardware having to encode the information. FIG. 1 shows, in block diagram form, a stand-alone encoding retrieval and playback device 10. The heart of the encoding retrieval and playback device 10 is a digital signal processor (DSP) 12, which may serve several functions. In the event that retrieving a previously encoded version of particular media content is not available, the DSP 12 encodes the audio content as read from the CD/DVD reader 14. The encoded content, songs for example, is then stored on a storage device 16 which in the preferred embodiments is a hard disk device (HDD), but which may be any form of static storage. Additionally, the digital signal processor 12, under command of the controller 18, is responsible for sending the media content to a rendering engine 20 during playback mode. The rendering engine couples to a playback device, which in the preferred embodiments are speakers 22. In the specific case of an audio CD, for which previously encoded content is not available, the audio content is read from the CD reader 14, converted or encoded by the DSP 12 to an appropriate file format (such as MP3), and stored on the storage device 16. In the playback mode, the audio is read from the storage device 16 and converted by the DSP 12 to a suitable format for the rendering engine 20, which then produces the audio by way of speaker or speakers 22.

While the encoding retrieval and playback device 10 of the preferred embodiments is capable of encoding, preferably the device downloads an encoded version of the media content rather than doing the encoding itself. More particularly, the encoding retrieval and playback device 10 is preferably coupled to a server 24 across an Internet connection 26. Thus, the encoding retrieval and playback device 10 preferably also comprises a network interface 28 to couple the controller 18, and the remaining components of the device 10, to the server 24. The connection to the server may take many forms, such as through a dial-up connection, a broadband connection, a home-based network, a cellular network, and the like. Server 24 preferably stores previously encoded versions of media content. In the specific case of audio CDs, the server 24 preferably stores partial or complete audio CD contents in file formats different than that found on the CD. For example, the server could store all the songs of a particular CD in an MP3 format. In the preferred embodiments, the device 10 downloads the encoded information, rather than encoding that information itself. However, the consumer must inform the encoding retrieval and playback device 10 which media content to retrieve.

Figure 2:
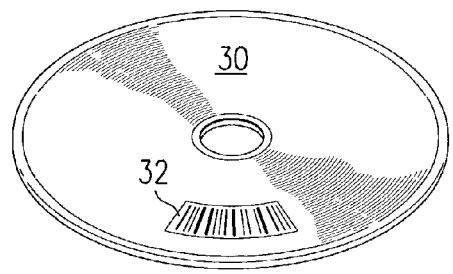
FIG. 2 shows a CD or DVD having an indicia thereon in the form of a barcode label.

In the preferred embodiments, each media device, such as an audio CD or DVD, has coupled thereto some form of indicium or unique identifier. FIG. 2 shows a storage media 30 in the form of a CD or DVD. In the exemplary case of storage media 30, the indicium is a barcode label 32. The barcode label 32 could be the UPC code for the storage media, but UPC codes generally only identify the brand and model of the device, they do not distinguish among devices of the same brand and model. The barcode label of the preferred embodiments encodes a number or alphanumeric string that uniquely identifies the particular storage media, even among storage media containing the same information. In the case of an audio CD, though the CD manufacturer may produce hundreds of thousands or millions of CDs, in the preferred embodiment each CD is assigned a unique number, which is encoded in the barcode labeled 32. Preferably, a consumer takes the storage media 30 with the indicium 32 thereon and scans the unique number using the barcode scanner 34 of the encoding retrieval and playback device 10 (FIG. 1). In this way, the entity that controls the server can track accesses to the encoded information, to help identify abuses. The device 10 thereafter accesses the server 24 over the Internet 26 and requests encoded content stored on the server 24 to be transferred across the Internet 26. Thus, in order to obtain an encoded version of the information on the storage media 30, the consumer need merely scan the indicium 32, and the encoding retrieval and playback device 10 retrieves the requested information from a server 24. Once initiated by the user, the encoding and retrieval device 10 preferably accomplishes the retrieval of the encoded information without further attention of the consumer. In the case where a consumer has multiple storage medias 30 for which encoded content is desired, preferably the retrieval encoding and playback device 10 has the capability to queue the unique identifying number for each storage media 30, and sequentially retrieve that information from the server 24.

FIG. 1 shows the encoding retrieval and playback device 10 coupled to a single server 24 across an Internet connection 26. However, showing a single server is meant only to exemplify the principles of retrieval of the encoded content by the device 10. In actuality, there may be many servers from which the device 10 retrieves encoded content. For example, each record label may have a server that stores the encoded content. Alternatively, if storage and allowing retrieval of encoded media is handled by a single entity, there may still be multiple servers 24, possibly spread throughout the United States or the world, each server making available its encoded content on a regional basis. Any implementation where the device 10 downloads all or part of the encoded media content from remote devices, as opposed to encoding that content itself, falls within the contemplation of the preferred embodiments.

FIG. 2 shows the preferred implementation of attaching the indicium 32 (in the preferred embodiments, a barcode label) on the surface of the storage media 30. However, there are other equivalent embodiments and devices for transferring the unique identification number of the storage media to the retrieval and encoding device 10. For example, it is possible that rather than using a barcode label, the unique identifying number could simply be printed or etched on some surface of the storage media 30. In this case, the consumer could enter the unique number by way of a user interface 36. In the preferred embodiments, the user interface 36 is simply a liquid crystal display (LCD) facilitating the delivery of text messages to the user, and a keypad for entry of numbers and other information; however, other, more complicated user interfaces may be equivalently used, such as color displays delivering graphical interfaces as well as standard and non-standard size keyboards.

Figure 3:
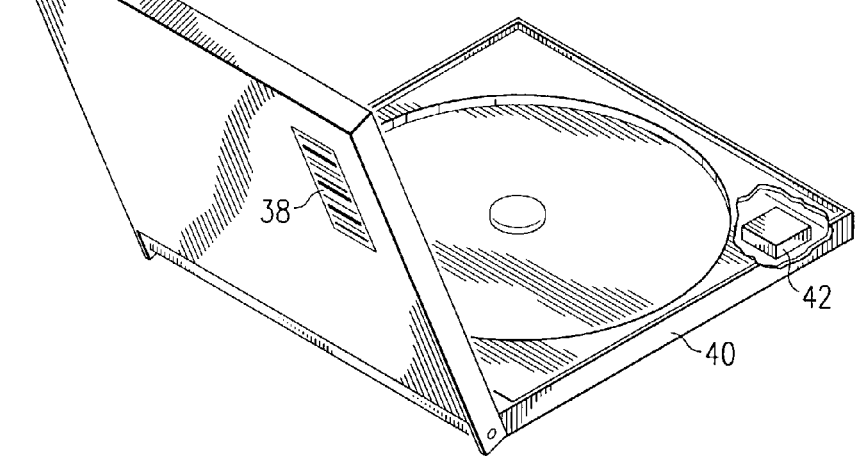
FIG. 3 shows two alternative methods for attaching the indicia.

Alternatively, indicia could be placed on a surface of the protective case or cover of the storage media, such as the barcode 38 on the front cover of the CD case 40, as shown in FIG. 3. Although the indicium 38 is shown on an outer surface, the identifying indicium 38 could be equivalently placed on the inside cover or any other location of the CD case 40. FIG. 3 also exemplifies yet another embodiment where, instead of using a barcode label as the indicium, a passive circuit or passive radio frequency device 42 could be coupled to or embedded in the CD case. In this case, the barcode scanner 34 of FIG. 1 would be replaced with the radio frequency transmitter/receiver. For the radio device embodiments, the consumer would merely hold the CD case close to the RF reader 34, in a manner and using similar technology to electronic identification tags for building access, parking garage access, and the like. One of ordinary skill in the art, now understanding how to use the indicium to identify and download encoded content, could easily devise many equivalent systems to perform this task.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a media playback device, comprising:
a digital signal processor configured to locally encode information stored on a storage media;
an indicia reader coupled to the digital signal processor; and
a network interface coupled to the digital signal processor;
wherein the media playback device is configured to:
read, using the indicia reader, an indicia coupled to a storage media storing playable content encoded in a first format, wherein the indicia uniquely identifies the storage media over all storage media storing the playable content;
access, based on the indicia read, a remote device using the network interface;
determine, based on the indicia read, whether a previously generated copy of the playable content encoded in a different format from the first format is stored on the remote device; and
retrieve, from the remote device, the playable content encoded in the different format from the first format;
wherein the media playback device is configured to initiate retrieval of the playable content from the remote device upon reading the indicia, and once initiated, to complete the retrieval without additional user input.

2. The system as defined in claim 1 wherein the media playback device further comprises a storage device coupled to the digital signal processor, and wherein the media playback device is further adapted to store the playable content encoded in the different format on the storage device.

3. The system as defined in claim 2 wherein the storage device further comprises a hard disk drive.

4. The system as defined in claim 2 wherein the storage device further comprises a static memory device.

5. The system as defined in claim 4 wherein the static memory device further comprises static random access memory.

6. The system as defined in claim 1 wherein the digital signal processor further comprises a part number TMS320VC5509 digital signal processor produced by Texas Instruments, Inc.

7. The system as defined in claim 1 wherein the indicia reader further comprises a barcode scanner, and wherein the indicia of the storage media further comprises a barcode label.

8. The system as defined in claim 7 wherein the barcode label is attached to the storage media.

9. The system as defined in claim 7 wherein the barcode label is attached to a protective cover of the storage media.

10. The system as defined in claim 1 wherein a passive radio frequency device is coupled to a protective case of the storage media.

11. The system as defined in claim 1 further comprising:
a storage media reader coupled to the digital signal processor;
a rendering engine coupled to the digital signal processor; and
a storage device coupled to the digital signal processor;
wherein the system is adapted to read information encoded in the first format using the storage media reader, and playback the information using the rendering engine; and
wherein the system is adapted to read information encoded in the different format from the storage device using the digital signal processor, and playback the information using the rendering engine.

12. The system as defined in claim 11 wherein the storage media reader further comprises an audio compact disk reader.

13. The system as defined in claim 11 wherein the storage media reader further comprises a digital video disk reader.

14. The system of claim 1, wherein the media playback device is configured to encode the playable content in the different format based on a determination that the remote device does not contain the playable content previously encoded in the different format.

15. The system of claim 1, wherein the indicia is trackable by the remote device to identify abuses of the indicia.

16. The system of claim 1, wherein the media playback device is configured to queue indicia for a plurality of storage media and sequentially retrieve the playable content stored on each storage media encoded in a different format from the remote device.

* * * * *